United States Patent [19]
Heckendorn

[11] Patent Number: 5,504,299
[45] Date of Patent: Apr. 2, 1996

[54] RESISTANCE WELDING SENSOR

[76] Inventor: Larry C. Heckendorn, 1112 Cloverknoll Ct., Columbus, Ohio 43235-4008

[21] Appl. No.: 415,729

[22] Filed: Apr. 3, 1995

[51] Int. Cl.⁶ .................................................. B23K 11/25
[52] U.S. Cl. ............................................ 219/109; 219/120
[58] Field of Search ...................................... 219/109, 110, 219/120, 86.51

[56] References Cited

U.S. PATENT DOCUMENTS

| | | | |
|---|---|---|---|
| 2,345,190 | 7/1944 | Benkert | 219/120 |
| 4,359,622 | 11/1982 | Dostoomian et al. | 219/109 |
| 4,472,620 | 9/1984 | Nied | 219/109 |
| 4,628,175 | 12/1986 | Nissl | 219/109 |
| 5,434,382 | 7/1995 | Schlattl et al. | 219/109 |

Primary Examiner—Clifford C. Shaw
Attorney, Agent, or Firm—Thomas S. Baker, Jr.

[57] ABSTRACT

An electrical resistance welding sensor assembly useful for monitoring various resistance welding process parameters in real-time during welding operations is provided with a base element adapted to be inserted into a tapered, water-cooled, electrode tip holder, with a sensor element adapted to receive a tapered, water-cooled, electrode tip, and with an in-line integral coolant passageway extending therethrough, the sensor element having a wall component which is provided with various adhered electrical transducer devices, which conducts and transmits welding process clamping loads and electrical currents, and which is cooled by coolant flowed through the integral coolant passageway.

24 Claims, 3 Drawing Sheets

RESISTANCE WELDING SENSOR

FIELD OF THE INVENTION

This invention relates generally to electrical resistance welding, and particularly concerns a sensor assembly which may be advantageously utilized in combination with conventional resistance welding equipment to detect, during equipment operation and in real-time, equipment welding process parameters such as electrode clamping force, electrode electrical current, electrode electrical voltage, and electrode coolant flow. The detected process parameters are typically subsequently measured and utilized, in either digital or analog signal form, for purposes such as display to the equipment operator, feedback input to equipment process servo control circuits, and accomplishing equipment shutdown.

BACKGROUND OF THE INVENTION

Known electrical resistance welding equipment such as spot welders that have conventional water-cooled electrode holders and cooperating replaceable electrodes are typically utilized in connection with high-volume production operations wherein continuing close control of various welding process parameters is desired. For instance, often it is desired to monitor and vary to some standard or preferred and selected level, if necessary, welding equipment actual process parameters such as the clamping pressure (force) existing between the equipment electrodes, electrical current flow to and through the welder electrodes, electrode electrical voltage, and adequacy of electrode coolant flow.

Heretofore, and particularly with respect to monitoring and adjusting equipment electrode load (pressure) levels, it has been common to interrupt on-going production operations for the purpose of separately making the necessary parameter measurements and accomplishing a desired adjustment to the resistance welding equipment. (In the case of taking actual electrode pressure or load measurements, equipment welding shutdown has been necessary because known available welding process parameter sensors cannot tolerate the high temperatures produced by the high current level through the measuring device and at the tips of equipment electrodes even though the electrodes may be water-cooled). Afterwards, production operation of the welding equipment is resumed but most often with a newly-adjusted parameter level.

Accordingly, a principal object of the present invention is to provide a resistance welding sensor assembly which may be utilized, in combination with a resistance welder, to make welder electrode actual clamping load (pressure) measurements on a real-time basis without having to interrupt welding equipment operation. Another object of this invention is to provide a resistance welding sensor which may be also utilized, in combination with a resistance welder, to simultaneously detect and measure other equipment operating parameters such as electrode electrical current, electrode reference electrical voltage, and adequacy of electrode cooling.

A still further object of the present invention is to provide a resistance welding sensor which may be readily installed in and removed from a cooperating electrical resistance welder, and which also does not complicate the insertion and removal of replacement electrodes in and from such welder.

Other objects and advantages of the present invention will become apparent from a careful reading and consideration of the invention summary, detailed description, claims, and drawings which follow.

SUMMARY OF THE INVENTION

The resistance welding sensor assembly of this invention is basically comprised of a base element, a sensor element joined to the base element and having interior cooperating clamping load, current, and temperature transducer components and a voltage reference point component, and an electrical junction box element joined to the sensor element. The assembly base element includes a shank component having a RWMA (Resistance Welder Manufacturer's Association) standard external taper which upon sensor assembly installation cooperates with the RWMA standard internal taper of a conventional electrode tip holder socket; the invention assembly sensor element includes a socket component having a RWMA standard internal taper which upon sensor assembly installation receives and cooperates with the RWMA standard external taper of a conventional electrode tip shank. A continuous passageway passing through the base element shank component and through the sensor element to the sensor element socket component functions to receive a correctly positioned electrode holder coolant tube and accommodate the discharge flow of electrode tip coolant.

Alternatively, the base element may have a threaded bore or any other suitable mechanical connection mechanism to connect to the electrode holder. The base itself may be a modified electrode holder.

The sensor assembly of the present invention also typically includes a restraint ring element which functions to limit outward displacement of the sensor element in the vicinity of its socket component upon welding electrode insertion and use, a sealing plate element which functions to close the sensor element interior containing the various sensor transducer components with their attendant electrical wiring connections, and an armored cable element which is physically joined to the assembly junction box and which contains the insulated signal wires which operationally connect the sensor transducer components to a sensor output socket element.

It should be noted that the assembly base, sensor, and sealing plate elements are preferably joined to each other by an electron beam welding technique or acceptable alternate procedure.

DESCRIPTION OF THE DRAWINGS

FIG. 4 is an sectioned plan view similar to FIG. 2 but of a still further embodiment of the sensor assembly of this invention.

DETAILED DESCRIPTION

Figure 1:
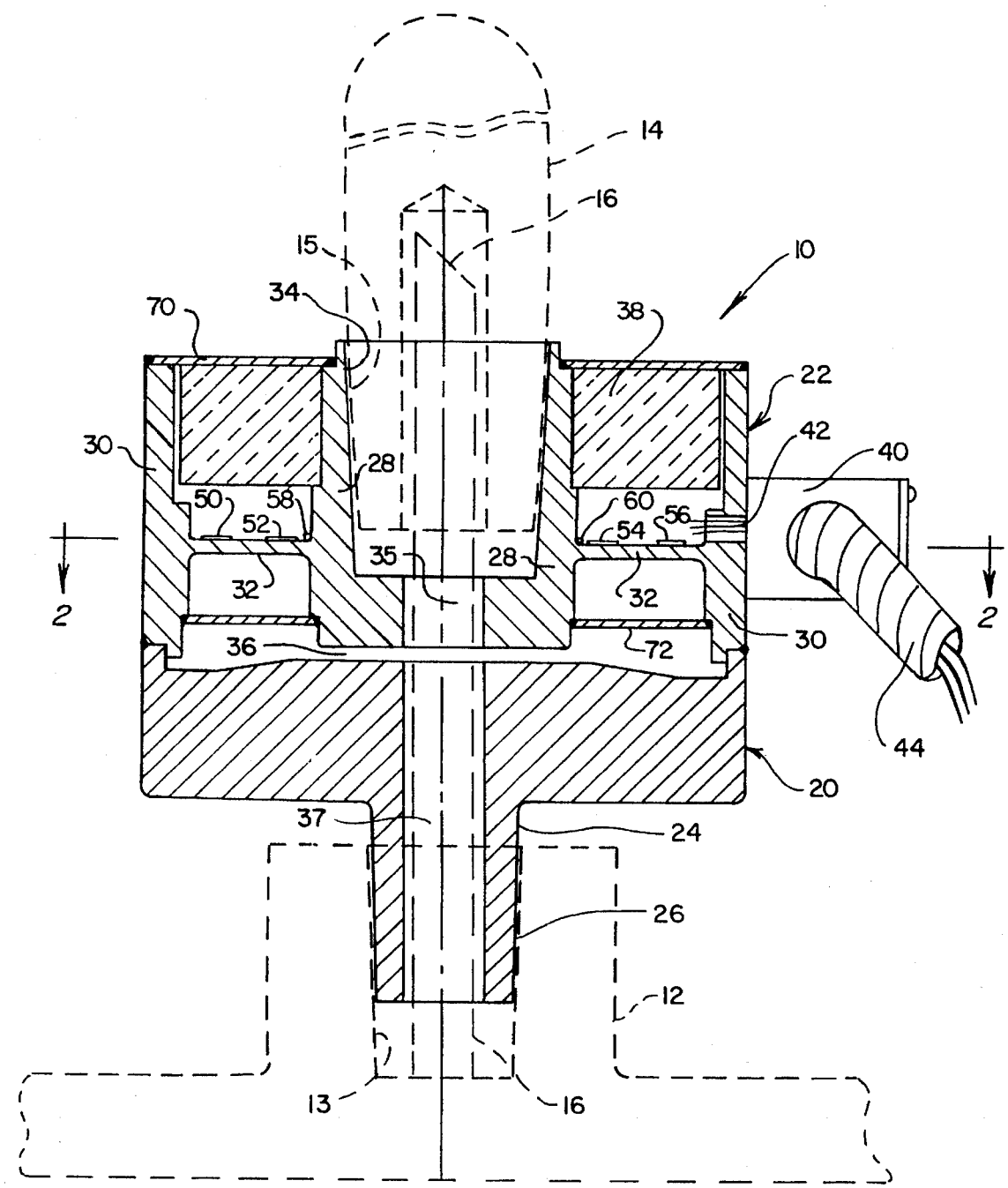
FIG. 1 is a schematic sectioned elevation view of a preferred embodiment of the sensor assembly of the present invention.

Referring to FIG. 1, a preferred embodiment of the present invention is designated 10 and is shown in in-line combination with a conventional resistance welder electrode tip holder 12 and replaceable electrode tip 14. For clarity purposes, elements 12 and 14 illustrated in FIG. 1 with dotted lines. The FIG. 1 form of electrode tip holder 12 is that of a platen-mounted type holder that includes a coolant tube component 16 which functions to deliver coolant from a holder supply inlet (not shown) to the interior coolant cavity surfaces of conventional electrode tip 14. (The holder coolant outlet also is not shown in the FIG. 1 illustration). Elements 12 and 14 are typically manufactured of conventional copper alloys (RWMA—Types I, II, III & IV) selected for their electrical conductivity and mechanical properties at elevated temperature.

Assembly 10 is basically comprised of a base element 20 and a sensor element 22 preferably joined together by electron beam welding on final assembly. Base element 20 has an integral shank component 24 that includes an exterior tapered surface 26 that cooperates with the tapered interior surface 13 of the tip socket component of holder element 12. Assembly sensor element 22 has a tubular interior wall component 28, a tubular exterior wall component 30, and a web-like annular diaphragm wall component 32, all joined together in an integral and unitary manner. The interior wall component 28 includes a socket provided with an interior tapered surface 34 that receives and cooperates with tapered shank 15 of electrode tip 14. All tapered shank and socket surfaces are preferably sized and tapered in accordance with RWMA standards. The exterior surface of base element 20 may have a hexagonal or other geometrical configuration adopted for engagement by an open end wrench or other tool to prevent rotation of the assembly 10 during electrode removal.

It should be noted that base element 20 may be configured as an electrode tip holder and sensor assembly 22 may be joined directly thereto.

One of the key features of sensor assembly 10 are the centrally positioned and aligned internal passageways 35 and 37 that extend through sensor element 22 and through base element 20 to accommodate the coolant tube 16 of electrode holder 12. Passageways 35 and 37 also are sized sufficiently larger than coolant tube 16 to provide a passageway for the flow of heated coolant following contact with electrode tip 14.

It is important that sensor assembly 10 further includes a gap element 36 and a restraint ring element 38. The gap element 36 is positioned intermediate base element 20 and the lower extreme of tubular wall component 28, and must be of sufficient depth or separation to permit the complete flexing of diaphragm wall component 32 as wall component 28 is moved downward relative to wall component 30 as a result of welding process clamping pressures (loads) generated at electrode tip 14 during welder equipment resistance welding operations. Restraint ring element 38 is annular in configuration and is provided in assembly 10 to essentially eliminate any outward displacement of tubular wall component 28 as a consequence of the insertion of electrode tip 14 and application of downward pressures to electrode tip 14 and its mated shank tapered surface 15. It should be noted that restraint ring 38 preferably has a contacting fit with its cooperating tubular wall component 28 surface, and also preferably has an exterior diameter that is less than the interior diameter of the adjacent interior surface of tubular wall component 30 so as to provide a gap (not numbered) that will accommodate a limited amount of restraint ring 38 outward lateral displacement.

Elements 20, 22, and 38 are preferably fabricated using an electrically conductive beryllium-copper alloy thus providing a current path for the sensor that basically follows the sensor load path, i.e. from electrode tip 14 successively through tubular wall component 28, through diaphragm wall component 32, through the lowermost portion of tubular wall component 30, and thence through base element 20, including shank component 26 into electrode holder element 12.

Included in assembly 10 and attached to sensor element 22 in any suitably manner is a conventional electrical junction box element 40 that is aligned with an opening 42 positioned in wall component 30 above the upper surface of diaphragm wall component 32. Opening 42 and junction box 40 accommodate the electrically-insulated leads which extend from the various transducers and the like contained within sensor assembly 10 and through armored cable component 44 to conduct the sensor's output signals to their point of utilization.

Figure 2:
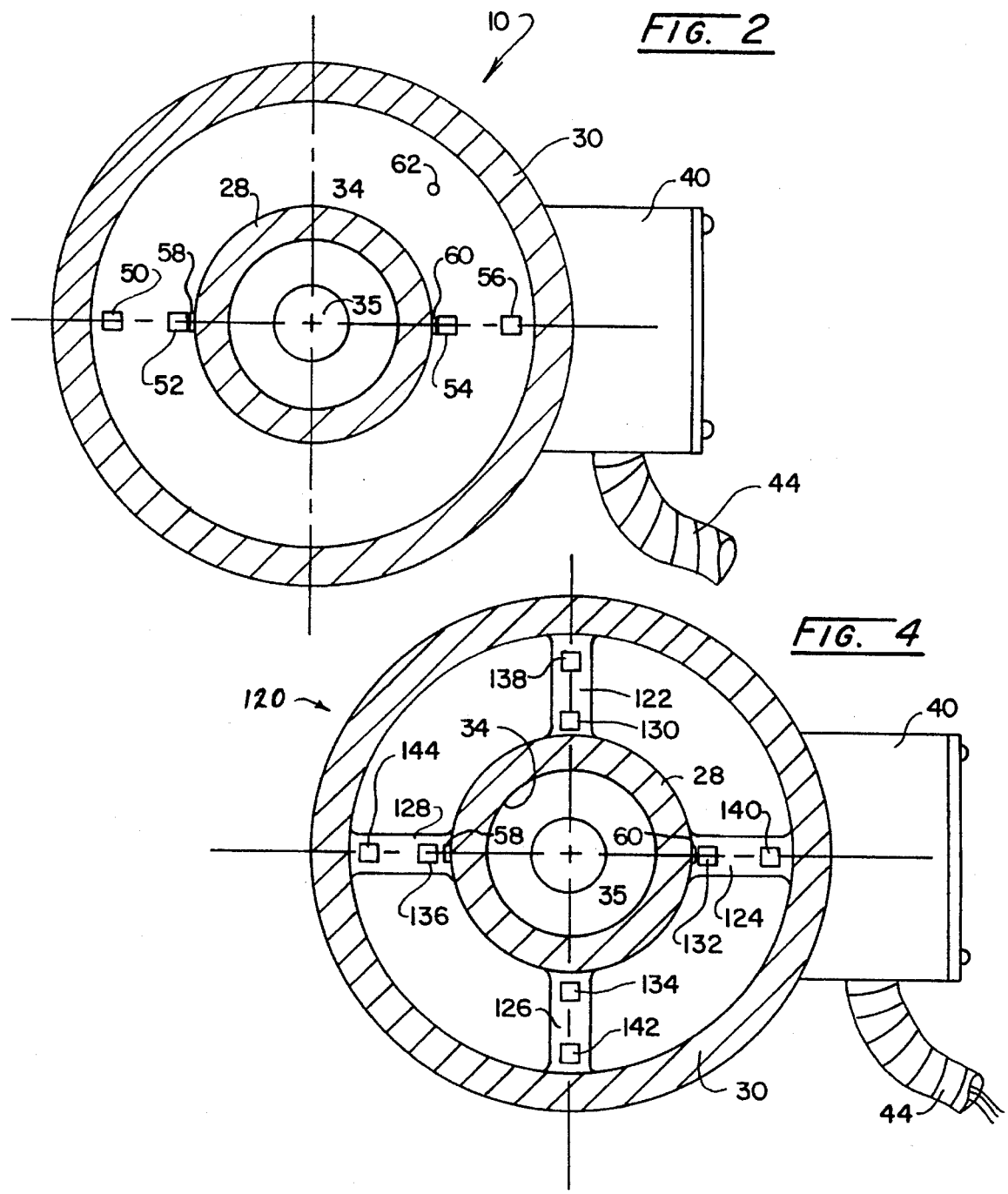
FIG. 2 is a sectioned plan view of the invention embodiment of FIG. 1 taken at line 2—2 of FIG. 1.

Contained interiorly with sensor assembly 10 are electrical strain gage transducers 50, 52, 54, and 56, thermistor (electrical resistance thermometer) transducer 58, electrical current transducer 60, and also a reference voltage junction 62. Transducers 50 through 56 are conventional bonded foil type electrical resistance strain gage transducers appropriately adhered to the upper surface of diaphragm wall component 32 as by a suitable epoxy adhesive, and are electrically connected to comprise a conventional load-detecting, full Wheatstone bridge circuit. Electrical current transducer 60 preferably is a Hall-effect type current monitoring device and is preferably located on the upper surface of wall component 32 but positioned adjacent the inner or unwetted surface of tubular wall component 28 also using a suitable epoxy adhesive. (See FIG. 2). Similarly, thermistor transducer 58 also shown (FIG. 2) as being bonded to the upper surface of wall component 32 by a suitable adhesive. The reference voltage junction 62 is essentially a solder connection and may be provided in the upper surface of sensor diaphragm wall 32. Accordingly, components 50 through 62 are basically incorporated into assembly 10 in an essentially co-planar relationship. Conventional electrical wire leads, shrink wrap insulation, solder tabs, and the like are utilized in making the required conventional electrical connections to the transducer devices and to the leads passing through armored cable 44.

Lastly, and with respect to FIG. 1 and assembly 10, a relatively thin, annularly configured, metallic closure plate element 70 is positioned over the opening between the upper ends of tubular wall components 28 and 30 as shown in FIG. 1, and electron beam welded in place to provide a hermetically sealed interior for the contained electrical transducers 50 through 60 and their electrical connections. (Normally opening 42 in tubular wall component 30 is filled with a potting compound during assembly of the elements of assembly 10 to aid in the sealing of the assembly interior from foreign materials encountered in subsequent use of the assembly. Also, and optionally, another thin metallic closure plate element 72 may be included in assembly 10 to protect the underside of sensor diaphragm wall component 32 from being adversely affected temperature-wise by coolant flowed into or through required gap 36 intermediate base element 20 and the lower extreme of sensor tubular wall component 28).

It should be kept in mind that in sensor assembly embodiment 10 the sensor wall element 32 has an annular configuration which acts as a diaphragm upon the application and release of pressure loads to and from electrode tip 14 during resistance welding operations. Also, in the typical full bridge circuit, transducers 52 and 54 detect compression bending strains and transducers 50 and 56 function to detect tension bending strains.

Figure 3:
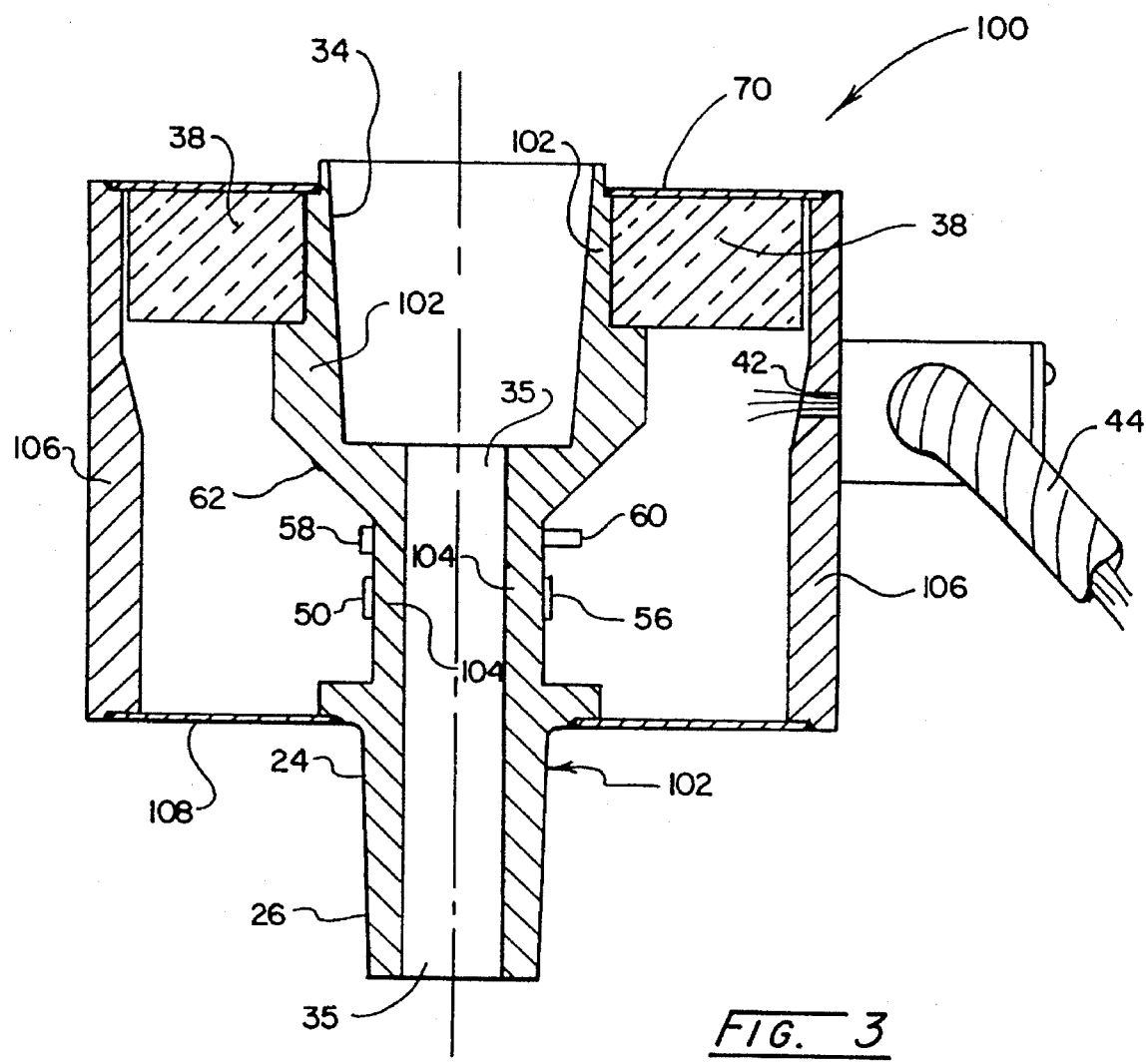
FIG. 3 is a schematic sectioned elevation view of an alternate embodiment of the sensor assembly of the present invention.

The alternate invention embodiment 100 of FIG. 3 is much like embodiment 10 with the major difference being that the base element 20 and sensor element 22 are essentially combined into a unitary base/sensor element 102 that includes an integral tubular wall element 104 which, with its attached strain gage transducers, functions as a columnar load cell. For purposes of illustration clarity, the cooperating resistance welder electrode holder and electrode tip components are not shown in FIG. 3. Transducers 50 through 60 are adhesively attached to the inner surface of that tubular wall element. In order to provide a hermetically-sealed interior to contain the various transducers, electrical connections, etc., assembly 100 is provided with an outer sleeve element 106 and an additional thin closure plate element 108. As in the case of invention embodiment 10, final assembly preferably involves electron beam welding of the various metallic elements (base element, sensor element, closure plate elements, etc.) into a sealed unitary structure. In the FIG. 3 invention embodiment the load pressure and electrical current paths are from the equipment electrode tip, thence through combined base/sensor element 102, including its tapered shank surface 26, and into electrode holder 12.

An acceptable "load cell" arrangement for the resistance welding sensor assembly of this invention in lieu of the sensor diaphragm wall component with strain gage transducers shown in FIG. 1 is the "load cell" arrangement illustrated in FIG. 4. In that arrangement the assembly sensor element is designated 120 and it is provided with four spaced-apart, web-like beam elements 122 through 128 and with eight attached electrical resistance strain-gage type transducer devices 130 through 144 instead of with diaphragm wall component 32 and its adhered transducers 50 through 56. Transducers 130 through 136 detect strains produced by compressional bending stresses and transducers 138 through 144 detect strains caused by tension bending stresses. Alternatively, not illustrated the transducers 130 through 144 can be placed on the sides of the web-like beam elements 122–128. In these positions the transducers detect shear strains caused by the deflection force(s).

Although not shown in the drawings, armored cable 44 and its contained electrical leads for the various transducer devices and reference voltage point typically terminate at a conventional computer-type socket connector component. The output signals produced by the various transducer components in real-time during welding equipment welding operation are initially in analog form but may be readily converted to digital form if so-desired for subsequent utilization. As previously suggested, such signals may be utilized for purposes such as quantitative displays to the equipment operator to aid in making load pressure, electrical current, and coolant flow adjustments, inputting to servo control circuits for automatic control of the monitored welding process parameters, for initiating shut-down procedures or like emergency action, or for a combination of such purposes.

I claim my invention as follows:

1. A resistance welding sensor assembly for monitoring parameters of a resistance welding process, and comprising:
   an electrically-conductive base element having an external hollow shank provided with a mounting surface configured to cooperate with a welding electrode tip holder;
   an electrically-conductive sensor element fixedly joined to said base element and having an internal socket component provided with a mounting surface configured to complement the external surface of a tapered welding electrode tip;
   a through coolant passageway contained within said base and sensor elements and extending from said base element external hollow shank to said sensor element internal socket; and
   a sensor element integral wall component having adhered electrical resistance transducers which detect a welding process clamping load parameter that produces tension and compression bending strains in said assembly sensor element as a result of welding process clamping forces being applied to said sensor element socket component,
said sensor element wall component being a load path for welding process clamping forces, conducting the resistance welding electrical current, and being cooled by coolant flowed through said through coolant passageway during sensor assembly monitoring of an electrical resistance welding process.

2. The resistance welding sensor assembly defined by claim 1 wherein a laterally-oriented gap component exists intermediate said base element and said sensor element, said sensor element wall component functioning as a diaphragm and being at least partially displaced into said gap component during sensor assembly monitoring of an electrical resistance welding process.

3. The resistance welding sensor assembly defined by claim 1 wherein said sensor element wall component has a tubular configuration and directly joined to said base element in a gap-free relationship, said wall component functioning as a column which is compressed intermediate said sensor assembly interior socket component and said sensor assembly external shank component during sensor assembly monitoring of an electrical resistance welding process.

4. The resistance welding sensor assembly defined by claim 1 wherein a laterally-oriented gap component exists intermediate said base element and said sensor element and wherein said sensor element wall component has a spoked-wheel configuration, said sensor element wall component functioning as multiple, spaced-apart beams which are at least in part displaced into said gap component during sensor assembly monitoring of an electrical resistance welding process.

5. The resistance welding sensor assembly defined by claim 1 and further comprising an electrical current transducer, said electrical current transducer monitoring electrical current flowed through said sensor element wall component during sensor assembly monitoring of an electrical resistance welding process.

6. The resistance welding sensor assembly defined by claim 1 and further comprising an electrical resistance temperature transducer, said electrical resistance temperature transducer monitoring the temperature of said sensor element wall component during sensor assembly monitoring of an electrical resistance welding process.

7. The resistance welding sensor assembly defined by claim 1 wherein said through coolant passageway is sized in cross-section and length to accommodate an electrode tip holder coolant supply tube and a return coolant passageway surrounding said coolant supply tube.

8. The resistance welding sensor assembly defined by claim 1 and further comprising a reference voltage junction, said reference voltage junction being located on a surface of said element integral wall component.

9. The resistance welding sensor assembly defined by claim 1 wherein said base element has a polygonal shaped exterior surface.

10. In combination with an electrical resistance welder, apparatus for monitoring electrical resistance welding process parameters, including electrode clamping forces, and comprising:

a coolant-cooled electrode tip holder element having a tapered socket;

a replacement coolant-cooled electrode tip element having a tapered shank; and an in-line process parameter sensor element positioned intermediate said electrode tip holder element and said electrode tip element, and having a tapered shank component that cooperates with said tip holder element tapered socket and a tapered socket component that cooperates with said electrode tip element tapered shank, said process sensor element further having a through passageway component within which coolant is flowed from said electrode tip holder element to said electrode tip element and returns, and an electrode clamping force transducer array component which indirectly is cooled by the coolant flowed in said through passageway.

11. The invention defined by claim 10 wherein said sensor element has a wall component which functions as a diaphragm, said sensor element electrode clamping force transducer array component being adhered to a surface of said diaphragm wall component.

12. The invention defined by claim 11 wherein said sensor element has an electrical current transducer component, said electrical current transducer component being adhered to a surface of said diaphragm wall component.

13. The invention defined by claim 10 wherein said sensor element has a wall component which functions as a tubular column, said sensor element electrode clamping force transducer array component being adhered to a surface of said tubular column wall component.

14. The invention defined by claim 13 wherein said sensor element has an electrical current transducer component, said electrical current transducer component being adhered to a surface of said tubular column wall component.

15. The invention defined by claim 10 wherein said sensor element has a wall component which functions as a multiplicity of radially-oriented and spaced-apart beams, said sensor element electrode clamping force transducer array component being adhered to the surfaces of said beam-like wall component.

16. The invention defined by claim 10 wherein said sensor element has an electrical current transducer component, said electrical current transducer component being adhered to a surface of said wall component.

17. A resistance welding sensor assembly for monitoring parameters of a resistance welding process, and comprising:

an electrically-conductive base element having a welding electrode tip holder configuration;

an electrically-conductive sensor element fixedly joined to said base element and having an internal socket component provided with a mounting surface configured to cooperate with a welding electrode tip;

a through coolant passageway contained within said base and sensor elements and extending from said base element to said sensor element internal socket; and a sensor element integral wall component having adhered electrical resistance transducers which detect a welding process clamping load parameter that produces tension and compression bending strains in said assembly sensor element as a result of welding process clamping forces being applied to said sensor element socket component, said sensor element wall component being a load path for welding process clamping forces, conducting the resistance welding electrical current, and being cooled by coolant flowed through said through coolant passageway during sensor assembly monitoring of an electrical resistance welding process.

18. The resistance welding sensor assembly defined by claim 17 wherein a laterally-oriented gap component exists intermediate said base element and said sensor element, said sensor element wall component functioning as a diaphragm and being at least partially displaced into said gap component during sensor assembly monitoring of an electrical resistance welding process.

19. The resistance welding sensor assembly defined by claim 17 wherein said sensor element wall component has a tubular configuration and directly joined to said base element in a gap-free relationship, said wall component functioning as a column which is compressed intermediate said sensor assembly interior socket component and said sensor assembly external shank component during sensor assembly monitoring of an electrical resistance welding process.

20. The resistance welding sensor assembly defined by claim 17 wherein a laterally-oriented gap component exists intermediate said base element and said sensor element and wherein said sensor element wall component has a spoked-wheel configuration, said sensor element wall component functioning as multiple, spaced-apart beams which are at least in part displaced into said gap component during sensor assembly monitoring of an electrical resistance welding process.

21. The resistance welding sensor assembly defined by claim 17 and further comprising an electrical current transducer, said electrical current transducer monitoring electrical current flowed through said sensor element wall component during sensor assembly monitoring of an electrical resistance welding process.

22. The resistance welding sensor assembly defined by claim 17 and further comprising an electrical resistance temperature transducer, said electrical resistance temperature transducer monitoring the temperature of said sensor element wall component during sensor assembly monitoring of an electrical resistance welding process.

23. The resistance welding sensor assembly defined by claim 17 wherein said through coolant passageway is sized in cross-section and length to accommodate an electrode tip holder water supply tube and a return coolant passageway surrounding said water supply tube.

24. The resistance welding sensor assembly defined by claim 17 and further comprising a reference voltage junction, said reference voltage junction being located on a surface of said element integral wall component.

* * * * *